United States Patent [19]

Trudeau

[11] Patent Number: 4,718,779
[45] Date of Patent: Jan. 12, 1988

[54] SEALED COMPOUND BEARING

[75] Inventor: William H. Trudeau, Brighton, Mich.

[73] Assignee: O & S Manufacturing Company, Whitmore Lake, Mich.

[21] Appl. No.: 902,507

[22] Filed: Sep. 2, 1986

[51] Int. Cl.<sup>4</sup> ............... F16C 23/04; F16C 33/74
[52] U.S. Cl. ................... 384/206; 384/152; 384/202; 384/209
[58] Field of Search ............... 384/138–140, 384/143, 145, 146, 151–153, 202–210, 220, 222, 276, 295–297, 299, 301, 908, 909

[56] References Cited

U.S. PATENT DOCUMENTS

| 3,589,781 | 6/1971 | Hanley et al. | 384/152 |
| 3,806,158 | 4/1974 | Casey | 384/202 X |
| 4,331,367 | 5/1982 | Trudeau et al. | 384/202 |
| 4,620,805 | 11/1986 | Belanger | 384/908 X |

FOREIGN PATENT DOCUMENTS

| 119721 | 3/1945 | Australia | 384/206 |
| 2410032 | 9/1975 | Fed. Rep. of Germany | 384/203 |
| 2293273 | 12/1980 | Fed. Rep. of Germany | 384/202 |
| 204835 | 10/1923 | United Kingdom | 384/206 |
| 2020377 | 11/1979 | United Kingdom | 384/206 |

Primary Examiner—Stuart S. Levy
Assistant Examiner—Thomas R. Hannon
Attorney, Agent, or Firm—Gifford, Groh, VanOphem, Sheridan, Sprinkle and Dolgorukov

[57] ABSTRACT

A compound bearing consisting of an outer and an inner member movable relative to each other and between which are disposed load carrying annular members. The load carrying annular members comprise a pair of deformable plastic rings held between the outer and inner members under compression, and a metallic ring insert disposed between and separating the two deformable rings. The outer member is formed of two cup-shaped tubular members press-fitted over the metallic ring insert.

16 Claims, 8 Drawing Figures

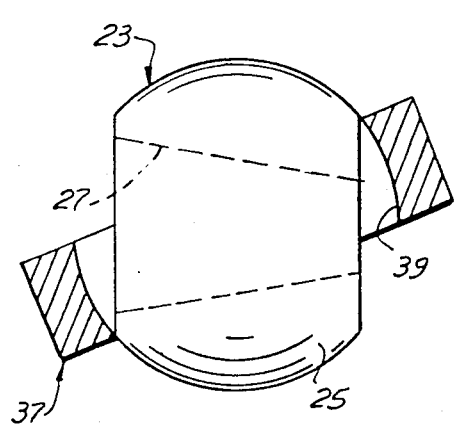 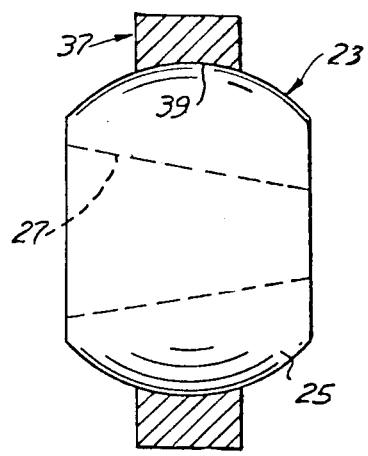
FIG. 4　　　　　FIG. 5
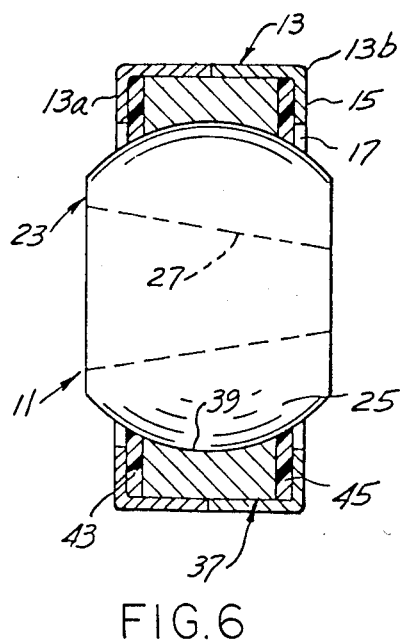 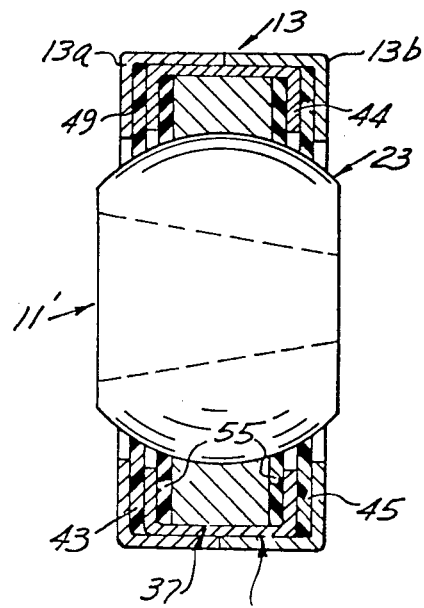
FIG. 6　　　　　FIG. 7
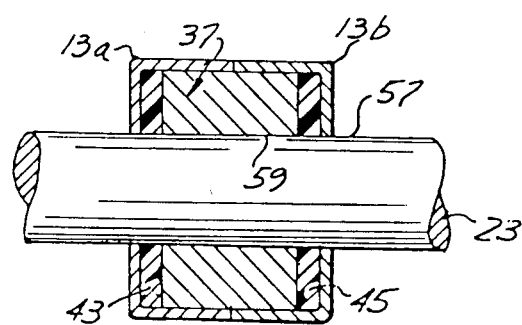
FIG. 8

SEALED COMPOUND BEARING

BACKGROUND OF THE INVENTION

The present invention relates generally to bearing structures and, more particularly, to a bearing structure adapted for oscillatory motion when under heavy load conditions.

The present invention is an improvement over the compound bearing described and claimed in U.S. Pat. No. 4,331,367 to Trudeau et al. In that patent a sealed compound bearing consists of outer and inner members movable relative to each other, between which are disposed load carrying annular members comprising elastomeric rings held between the outer and inner members under compression, and a metallic ring insert disposed between and separating the two elastomeric rings.

It has been found that bearings, according to the prior art, although satisfactory and long-lived under average medium duty service, tend to deteriorate rapidly when subjected to extremely heavy loads, especially if subjected to heat simultaneously with heavy loads, and, more particularly, in assemblies where adverse conditions of heavy load and heat are accompanied by substantial vibrations and shocks and an exaggerated amount of twisting, or relative motion, between the inner member and the outer member of the bearing. Such extremely adverse conditions are particularly prevalent when spherical bearings are utilized as a junction between suspension members and frame members, such as shock absorber attachment means in heavy duty motor vehicles, for example military combat vehicles, which are generally poorly maintained and called upon to operate under extremely adverse conditions. It has been discovered that under such extremely adverse conditions, when the bearings are continuously subjected to rapid twisting cycles under extremely heavy loads with repeated high frequency shocks, prior art bearings tend to heat up and, when further subjected to heat from the ambient, they deteriorate rapidly. The lubricant impregnating the fabric annual members becomes very fluid and extrudes from the fabric, and the extreme heat chars the fabric annular members and destroys the nylon or other plastic insert ring. It has also been discovered that because the prior art bearings are pre-loaded during manufacturing, they are relatively tight when new, and thus they provide a relatively stiff connection between the joined components and tend to generate heat when the engaged surfaces of the various components of the bearings are displaced relative to each other, due to the relatively high co-efficient of friction between the bearing element surfaces.

SUMMARY OF THE INVENTION

The principal object of the present invention is to provide a sealed compound bearing that requires few parts in assembly, which is of simple structure and which can be economically manufactured. A further object of the invention is to provide such sealed compound bearing that requires a single assembly step, namely press-fitting of two identical elements to form a housing directly over one of the bearing members, and which does not require any swaging or other operation for maintaining the elements in assembly.

These and further objects and advantages of the present invention will become apparent to those skilled in the art when read in conjunction with the accompanying drawings, and in which:

BRIEF DESCRIPTION OF THE DRAWING

FIGS. 4 and 5 are views showing consecutive steps in the assembly of a bearing; and FIGS. 6, 7 and 8 are views similar to FIG. 1, showing modifications of the invention.

DETAILED DESCRIPTION OF THE PREFERRED EMBODIMENT

Figure 1:
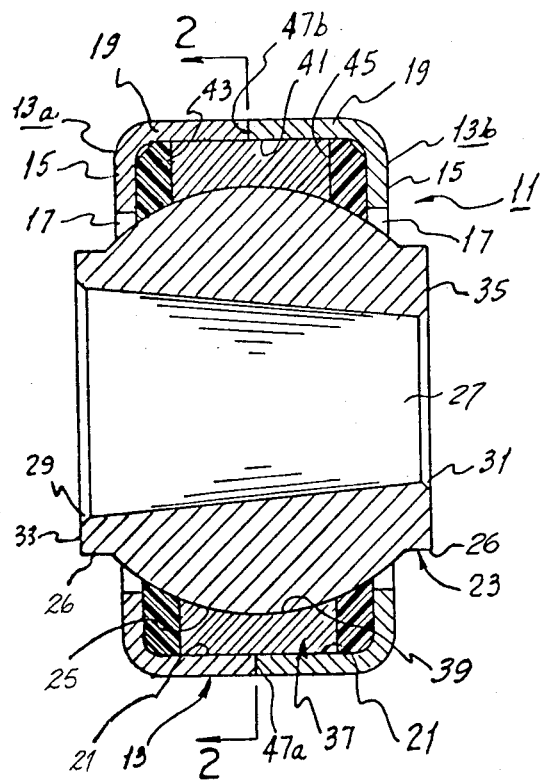
FIG. 1 is a schematic longitudinal scale view of the sealed compound bearing in accordance with the invention.

Referring to the drawing and more particularly to FIG. 1, an example of sealed compound bearing 11 according to the present invention comprises an outer seal 13 that is made in two generally cup-shaped half portions 13a and 13b. The shell half portions 13a and 13b are identical, and each tubular in form, being provided at an end with an inwardly radially extending annular flange 15 surrounding an aperture 17, the tubular body defining a peripheral cylindrical surface 19 and an inner cylindrical surface 21. An inner member is disposed within the bearing seal 13 which, in the example of structure illustrated, is a partial ball in the form of a tubular member or sleeve 23 having a peripheral spherical surface 25 and a pair of symmetrically disposed cylindrical trunnion portions 26.

As will be apparent to those skilled in the art, the inner member may take any appropriate form other than the one illustrated, such as, for example, a ball formed integrally on the end of a stud. In the example of structure illustrated, the ball sleeve 23 has an axially disposed frusto-conical bore 27 with chamfered edges 29 and 31 formed at the ends of the bore 27, at the junction of the bore surface with the annular end faces 33 and 35 of the trunnion portions 26. The frusto-conical bore 27 is adapted to accept the tapered end of a stud, not shown, or other male member, while the seal 13 of the bearing 11 is adapted to be clamped, or otherwise fastened, on the end of, for example, a rod, not shown, to establish a swivelling connection between the stud and the rod, as are typical in motor vehicle shock absorber mounts or axle torque rod joints.

Figure 2:
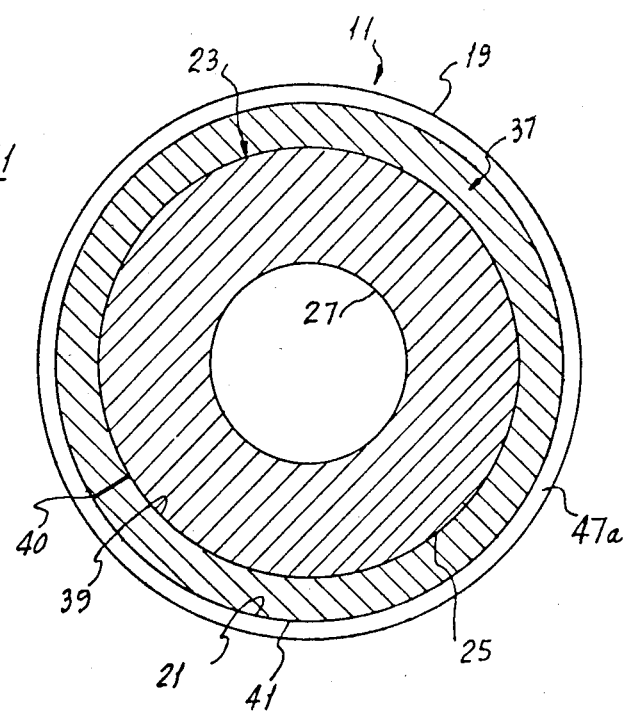
FIG. 2 is a transverse scale view along line 2—2 of FIG. 1.

The outer shell half portions or cup-shaped members 13a and 13b are conveniently made of steel or stainless steel stampings, while the inner ball member 23 is made of a steel, or stainless steel, forging, or of bar material machined so as to provide the tapered bore 27 and the peripheral spherical surface 25, the latter with a substantially smooth finish. A bearing ring insert 37, preferably made of steel, has a concave spherical surface 39 that mates and co-acts with the convex peripheral spherical surface 25 of the ball member 23. In order to be assembled over the peripheral spherical surface 25 of the ball member 23 provided with the trunnion portions 26, the bearing ring 37 is made in two sections or, alternatively, in a one-piece structure provided with a radial slit 40, as best shown at FIG. 2, which enables the bearing ring 37 to elastically expand such that it may be slipped over the spherical surface 25 of the ball member 23, and snapped back to the position illustrated at FIGS. 1 and 3 with the concave spherical bearing surface 39 of the bearing ring or insert 37 in engagement with the peripheral spherical surface 25 of the ball member 23, the end faces of the bearing insert ring 37, or slit edges, being in abutting engagement at the slit 40. The peripheral surface 41 of the bearing ring 37 is substantially cylindrical and has a diameter, with the edges of the slit 40 in abutting relationship, providing press-fitting within the internal cylindrical surface 21 of each of the seal cup members 13a and 13b. In structures wherein the ball member 23 is not provided with laterally projecting cylindrical trunnion portions 26, the bearing ring 37 is preferably solid, as the ball member 23 and the bearing ring 37 may be assembled simply by inserting the ball member within the bearing ring 37, as shown at FIG. 4, and pivoting one relative to the other, FIG. 5.

Figure 3:
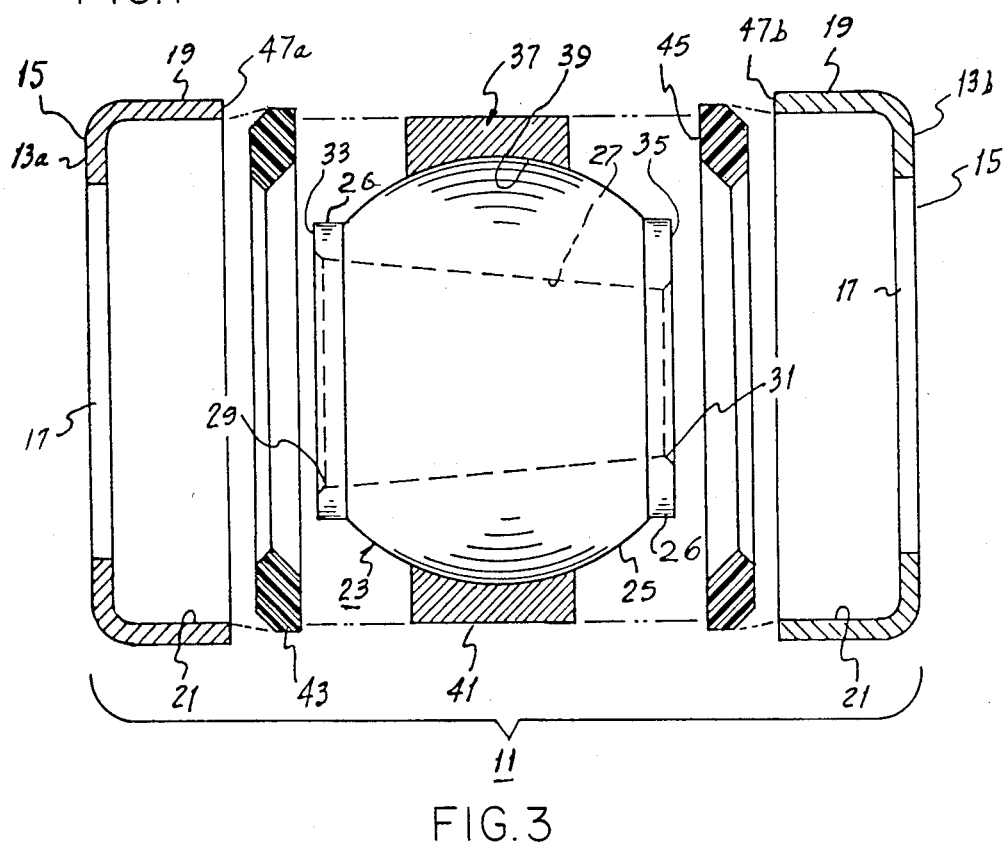
FIG. 3 is an exploded view of the bearing of FIG. 1.

A pair of identical rings 43 and 45, FIGS. 1, 3 and 6, are installed between each side surface of the bearing ring 37 and the inner surface of the cup-shaped half shell member flange 15. The rings 43 and 45 are made of fluorocarbon such as for example and preferably polytetrafluoroethylene or, in the alternative of "Ultra High Molecular Weight" (UHMW) polymer such as sold under the trademark "1900" by Himont U.S.A., Inc. of Wilmington, DE 19894, under the trademark HOSTALEN GUR by American Hoechst Corporation of Pasadena, TE 77507 and Houston, TE 77258, and under the trademark TUFLAR by Keltrol Enterprises, Inc. of York, PA 17402.

The separate elements forming the bearing of the invention, shown in exploded view at FIG. 3, are assembled simply by press-fitting the half sheel portions or cup-shaped members 13a and 13b over the bearing rings 37 disposed around the ball sleeve 23, with the ring 43 disposed on one side and the ring 45 disposed on the other side of the bearing ring 37. During press-fitting of the cup-shaped members 13a and 13b over the bearing ring 37, the rings 43 and 45 are compressed slightly diametrically and axially. The amount of compression of the rings 43 and 45 is determined by manufacturing tolerances as a function of the amount of pre-load exerted by the rings 43 and 45 upon the spherical surface 25 of the ball member 23 which is dependent upon the diametrically directed compression of the rings 43 and 45 and the axial compression of the rings 43 and 45. When fully press-fitted over the bearing ring 37, the edge 47a of the cylindrical body portion of the cup-shaped member 13a and the edge 47b of the cylindrical body portion of the cup-shaped member 13b are in abutting engagement, as shown at FIG. 1.

Because of the press-fit of the two shell cup-shaped members 13a and 13b over the bearing ring 37, the cup-shaped members 13a and 13b must be made with relatively close manufacturing tolerances, and the bearing ring 37 and the ball sleeve 23 must also be manufactured with relatively close tolerances, more particularly with respect to the diameter of the bearing ring peripheral cylindrical surface 41, its internal spherical surface 38 and the peripheral spherical surface 25 of the ball sleeve 23, if it is desired to control the looseness or tightness of the finished bearing. Such a requirement of close manufacturing tolerances is however compensated for by the simple assembly operation and by the performance of the finished product. When the bearing is manufactured with relatively loose tolerances, rings 43 and 45 made of fluorocarbon such as polytetrafluoroethylene are preferred, in view of the creeping characteristics of that material when highly compressed and subjected to heavy loads. During use under such conditions, polytetrafluoroethylene tends to creep and fill clearance spaced with the result that, after a certain period of breaking-in and aging, either prior to installation or progressively in the field, the bearing tends to function without play, without binding or stickup. Bearings made according to the present invention, more particularly when the rings 43 and 45 are made of UHMW polymer requires no additional seals to protect the bearing surface in swivelling sliding engagement.

Compound bearings according to the present invention, when subjected to intensive tests under transverse static load, coupled with vibrations and repeated cycles, during which the shell is rotated relative to the axis of the ball sleeve, generate much less heat than conventional bearings of comparable sizes having lubricant-impregnated fabric rings and a nylon ring insert.

The only difference between the structure of FIG. 6 and the structure of FIG. 1 is simply due to the bearing 11 of FIG. 6 having a solid single-piece bearing ring 37 installed over the ball member 23, as illustrated at FIGS. 4 and 5. By utilizing a solid single-piece bearing ring 37, a high quality precision bearing may be obtained, and an improved press-fit of the two shell cup-shaped shell members 13a and 13b over the bearing ring 37 may be achieved. It will be appreciated that the invention also permits to provide a plain unsealed bearing, such as illustrated at FIG. 5, with appropriate seals, FIG. 6, in the form of the rings 43 and 45 compressively held by the cup-shaped shell members 13a and 13b press-fitted over the bearing ring 37.

It will also be appreciated that, as illustrated at FIG. 7, a conventional sealed bearing 11', comprising a ball member 23 disposed swivelling within a bearing ring 37, in turn disposed in a single-piece shell 47 having end flanges 49 each holding a sealing ring 55 in compression between the interior surface of each flange 49 and the side surface of the bearing ring 37, can be improved, according to the invention, to provide a highly, or doubly, sealed bearing simply by press-fitting over the shell 47 the cup-shaped members 13a and 13b holding in compression the deformable rings 43 and 45. According to the results sought to be achieved, the rings 43 and 45 are made of fluorocarbon, such as polytetrafluoroethylene, or they are made of UHMW polymer.

The present invention also has applications in cylindrical bearing, as illustrated at FIG. 8, comprising a cylindrical inner member 23 having a cylindrical peripheral surface 57 in bearing engagement with the cylindrical inner surface 59 of the bearing ring 37. The half-shell portions or cup-shaped members 13a and 13b are press-fitted over the periphery of the bearing ring 37, thus compressibly holding the deformable rings 43 and 45.

Having thus described the invention in its present form, modifications thereof will be apparent to those skilled in the art, what is claimed as new is as follows:

1. A bearing comprising an inner member having a peripheral surface of a first regular predetermined contour, an outer member having an inner surface of a second regular predetermined contour, a metallic ring insert disposed between said peripheral surface of said inner member and said inner surface of said outer member, said ring insert having an inner surface generally conforming to said peripheral surface of said inner member and a peripheral surface generally conforming to and having a first predetermined dimension slightly larger than said inner surface of said outer member, a pair of resiliently deformable rings, each of said pair of rings disposed on one side of said ring insert, said outer member comprising two generally cup-shaped members, each of said cup-shaped members having a tubular portion forming said inner surface of said second predetermined contour and having a radially inwardly directed flange at one end, said second predetermined contour of said two cup-shaped members having a second predetermined being dimension smaller than said first predetermined dimension of said peripheral surface of said ring insert, said pair of two cup-shaped members being press-fitted over said ring insert in fixedly abutting contact whereby the flange of each of said cup-shaped members holds each of said deformable rings under compression such as to firmly engage each of said deformable rings with a portion of said peripheral surface of said inner member, a portion of said inner surface of said outer member and a lateral surface of said ring insert.

2. The bearing of claim 1 wherein said deformable rings are made of fluorocarbon material.

3. The bearing of claim 2 wherein said ring insert is made of steel.

4. The bearing of claim 3 wherein the peripheral surface of said inner member and the inner surface of said ring insert are conforming spherical surfaces.

5. The bearing of claim 2 wherein the peripheral surface of said inner member and the inner surface of said ring insert are conforming spherical surfaces.

6. The bearing of claim 2 wherein said fluorocarbon material is polytetrafluoroethylene.

7. The bearing of claim 6 wherein said ring insert is made of steel.

8. The bearing of claim 7 wherein the peripheral surface of said inner member and the inner surface of said ring insert are conforming spherical surfaces.

9. The bearing of claim 6 wherein the peripheral surface of said inner member and the inner surface of said ring insert are conforming spherical surfaces.

10. The bearing of claim 1 wherein said deformable rings are made of UHMW polymer.

11. The bearing of claim 10 wherein said ring insert is made of steel.

12. The bearing of claim 11 wherein the peripheral surface of said inner member and the inner surface of said ring insert are conforming spherical surfaces.

13. The bearing of claim 10 wherein the peripheral surface of said inner member and the inner surface of said ring insert are conforming spherical surfaces.

14. The bearing of claim 1 wherein said ring insert is made of steel.

15. The bearing of claim 14 wherein the peripheral surface of said inner member and the inner surface of said ring insert are conforming spherical surfaces.

16. The bearing of claim 1 wherein the peripheral surface of said inner member and the inner surface of said ring insert are conforming spherical surfaces.

* * * * *